US008414745B2

(12) United States Patent
Richards Cormier

(10) Patent No.: US 8,414,745 B2
(45) Date of Patent: Apr. 9, 2013

(54) LOW COST DESALINATION METHOD USING RENEWABLE ENERGY AND RECYCLED MATERIALS

(75) Inventor: Caroline Richards Cormier, Edmonton (CA)

(73) Assignee: Caroline Richards Cormier, Edmonton, Alberta (CA)

( * ) Notice: Subject to any disclaimer, the term of this patent is extended or adjusted under 35 U.S.C. 154(b) by 315 days.

(21) Appl. No.: 12/799,450

(22) Filed: Apr. 26, 2010

(65) Prior Publication Data
US 2011/0259729 A1 Oct. 27, 2011

(51) Int. Cl.
*B01D 3/10* (2006.01)

(52) U.S. Cl.
USPC ... 203/10; 203/11; 203/DIG. 1; 203/DIG. 17; 159/902; 159/903

(58) Field of Classification Search .............. 203/10–11, 203/DIG. 1, DIG. 17; 159/902, 903
See application file for complete search history.

(56) References Cited

U.S. PATENT DOCUMENTS

| | | | | | |
|---|---|---|---|---|---|
| 3,736,234 | A | * | 5/1973 | Miyamoto | 202/185.6 |
| 3,930,959 | A | * | 1/1976 | Kirschmann | 202/181 |
| 4,134,393 | A | * | 1/1979 | Stark et al. | 126/581 |
| 4,194,949 | A | * | 3/1980 | Stark | 202/180 |
| 4,595,460 | A | * | 6/1986 | Hurt | 203/21 |
| 7,153,395 | B2 | * | 12/2006 | Foster et al. | 202/234 |
| 7,264,695 | B2 | * | 9/2007 | Foster et al. | 202/234 |

OTHER PUBLICATIONS

Andrew Olson, "Solar-Powered Water Desalination", Oct. 12, 2007, Kenneth Lafferty Hess Family Charitable Foundation, pp. 1-5.*

* cited by examiner

*Primary Examiner* — Duane Smith
*Assistant Examiner* — Thomas McKenzie

(57) ABSTRACT

The scarcity of fresh water for human consumption and agricultural irrigation is an ongoing problem affecting billions of people. This problem is only getting worse with growing human populations, pollution and global warming. Relying on underground sources of fresh water is not a viable long-term solution. I propose to solve the problem of fresh water scarcity with a new kind of desalination method. This desalination method is comprised of recycled materials thereby reducing the amount of pollution in the world. This desalination method uses no other power sources other than solar energy. The usage of recycled materials and renewable energy sources thereby ensures that this desalination method is a low cost way of transporting seawater and converting it into fresh water.

5 Claims, 6 Drawing Sheets

LOW COST DESALINATION METHOD USING RENEWABLE ENERGY AND RECYCLED MATERIALS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION (1) Field of the Invention
Desalination.
(2) Description of Related Art Including Information Disclosed Under 37 CFR 1.97 and 1.98
Andrew Olson, "Solar-Powered Water Desalination", Dec. 10, 2007, Kenneth Lafferty Hess Family Charitable Foundation, pages 1-5.

BRIEF SUMMARY OF THE INVENTION

This invention makes the use of recycled materials and renewable energy to desalinate seawater. The recycled materials comprise of glass wine bottles and metal cans. The renewable energy source is derived from solar power.

BRIEF DESCRIPTION OF THE SEVERAL VIEWS OF THE DRAWING(S)

DETAILED DESCRIPTION OF THE INVENTION

Figure 1:
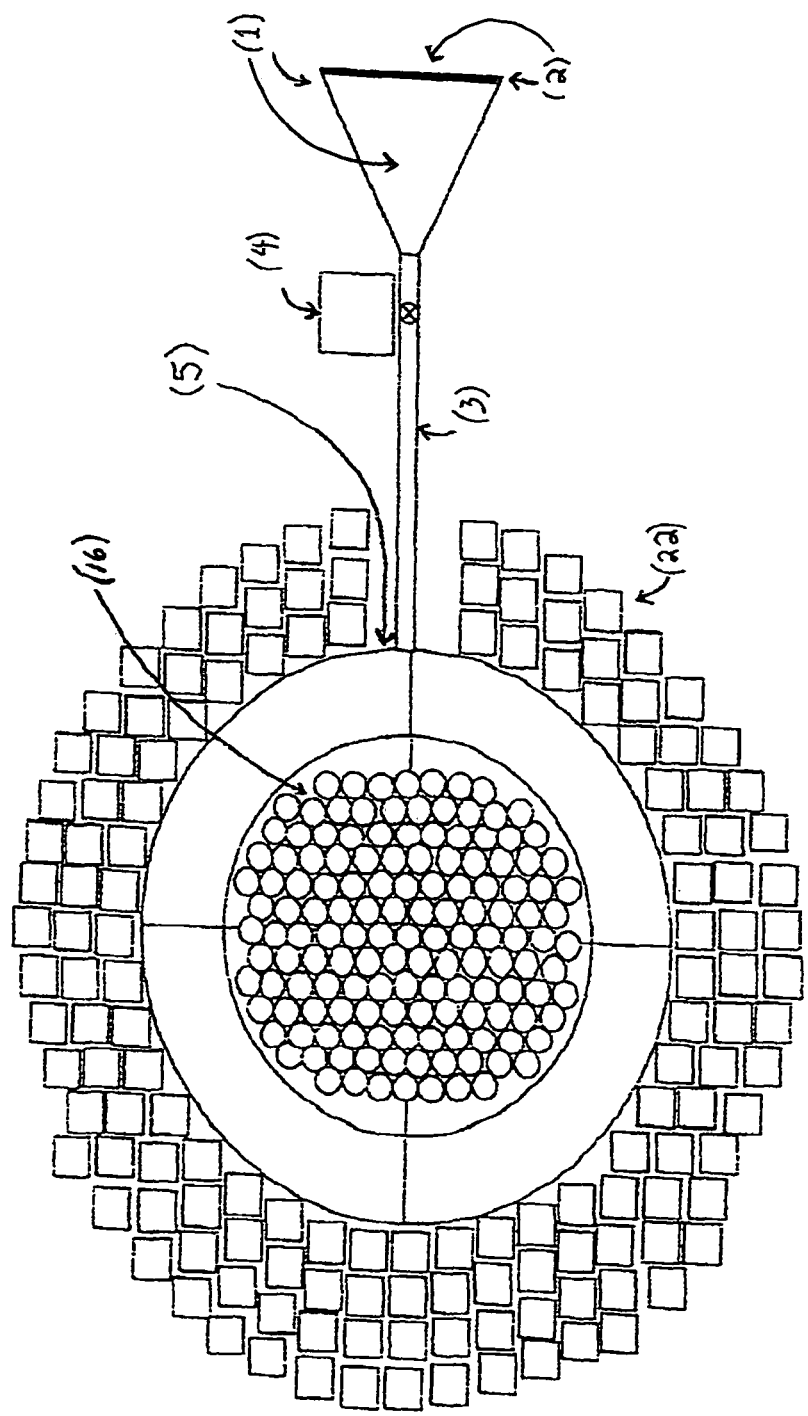
FIG. 1 is a an overhead view of wine bottles in the center of a donut shaped reservoir surrounded by solar powered panels, where the donut shaped reservoir is connected to a pipe which connects to a cone-shaped pipe and attached filter.

The scarcity of fresh water supplies is a growing problem. Factors such as expanding human populations, land irrigation and the pollution of waterways contribute to the shortage of fresh water. Sole reliance on current fresh water reserves is not a sustainable long-term option. The need to look into producing fresh water from seawater in a cost effective manner is therefore an extremely important endeavor. My invention desalinates seawater to produce fresh water using renewable energy power and recycled materials. It costs very little to operate as it uses solar power and curbs pollution by using recycled 750 ml glass wine bottles.

The seawater is collected at the shoreline via a cone shaped pipe (1). This pipe has a diameter of 1 to 5 meters at its opening on the shoreline (1). The seawater traverses a filter grid (2) upon entering the pipe (1). The pipe's (1) diameter is smaller as it progresses away from the shoreline. The cone shaped pipe (1) is 1-5 meters long. At the smallest end of the cone pipe (1), the diameter is 2-4 cm in diameter, which then attaches to a connecting pipe of similar diameter which is along its entire length, 'Y' meters (3). Along this connecting pipe (3) lies a solar powered water pump (4) to draw in the seawater into the reservoir (5).

The filtered seawater reservoir (5) is donut shaped and is made of two different layers (6) & (7). The outer layer (6) is comprised of recycled aluminum cans. The inner layer of the reservoir (7) is made of recycled aluminum cans. The inner layer of the reservoir (7) rotates along the horizontal plane on the inside of reservoir. The inner layer (7) has holes (8) that are aligned with the holes (8) in the outer layer (6), but when the inner layer (7) is rotated, it seals shut the holes (8) in the outer layer (6) since the holes are no longer aligned in the inner (7) and outer (6) layers. The cylinder reservoir (5) is approximately 22 to 25 cm in diameter. Tubes (9) are attached to the outer layer of the reservoir (6) at regular intervals along several parallel & perpendicular lines. The tubes (9) have a diameter of approximately 1 cm.

Figure 2:
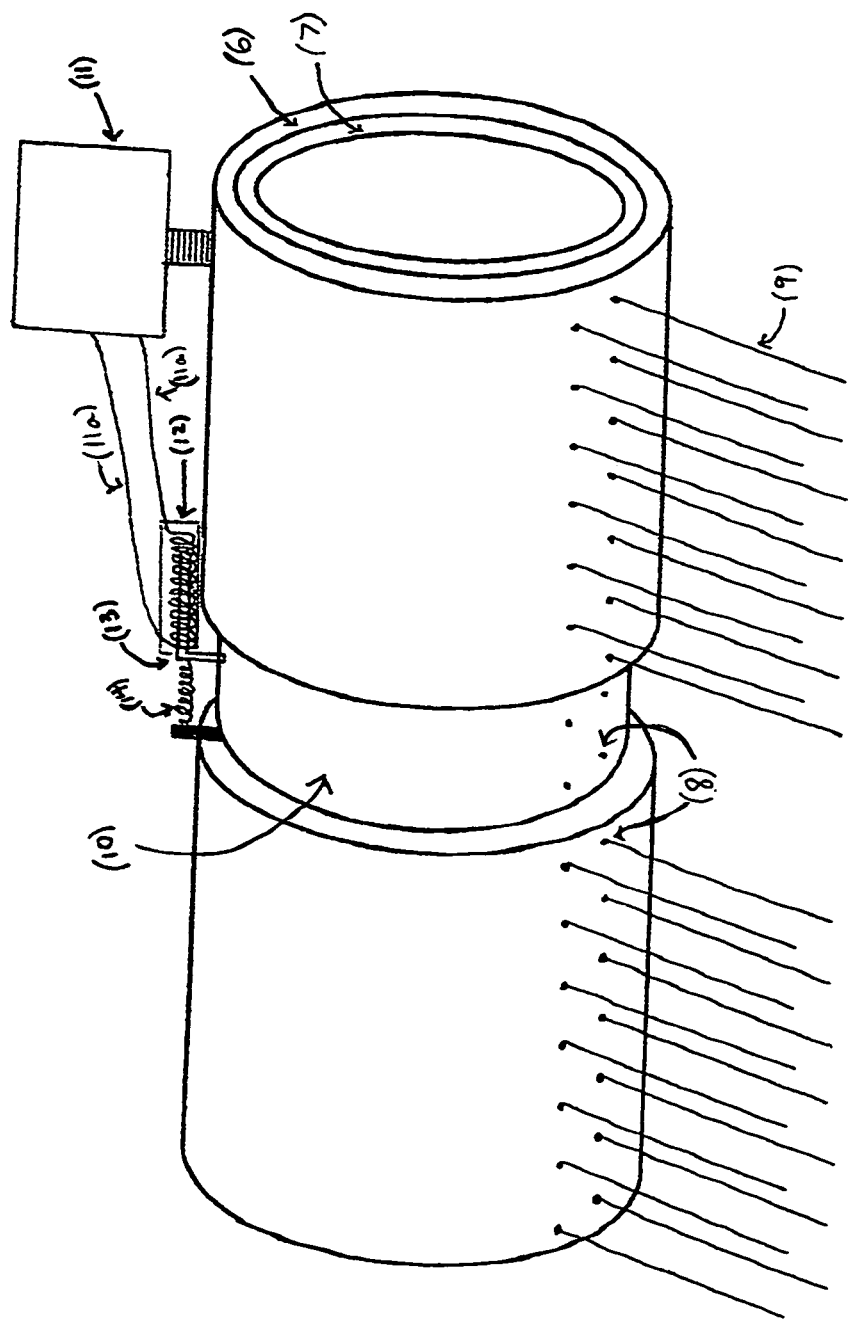
FIG. 2 is a cross-view of the donut shaped reservoir for the seawater when the solenoid is activated by the sun shining on the solar powered panel, causing the alignment of the holes in the outer and inner layers of the donut shaped reservoir and thereby allowing flow of seawater into tubes protruding from the reservoir.
Figure 3:
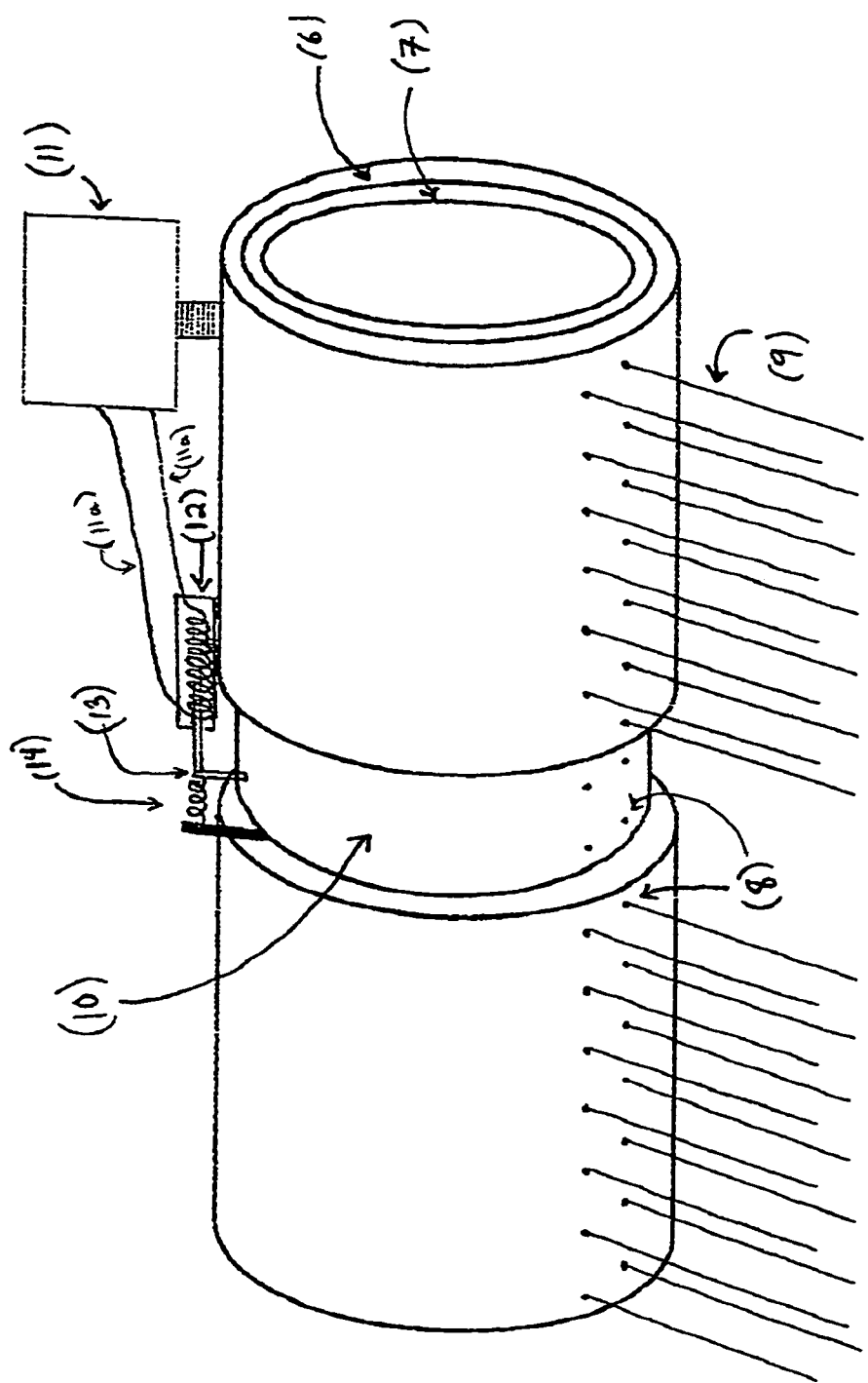
FIG. 3 is a cross-view of the donut shaped reservoir for the seawater when the solenoid is not activated since there is no light shining on the solar powered panel, causing the holes in the outer and inner layers of the donut shaped reservoir to not be aligned and thereby blocking the flow of seawater out of the donut shaped reservoir through the tubes.
Figure 4:
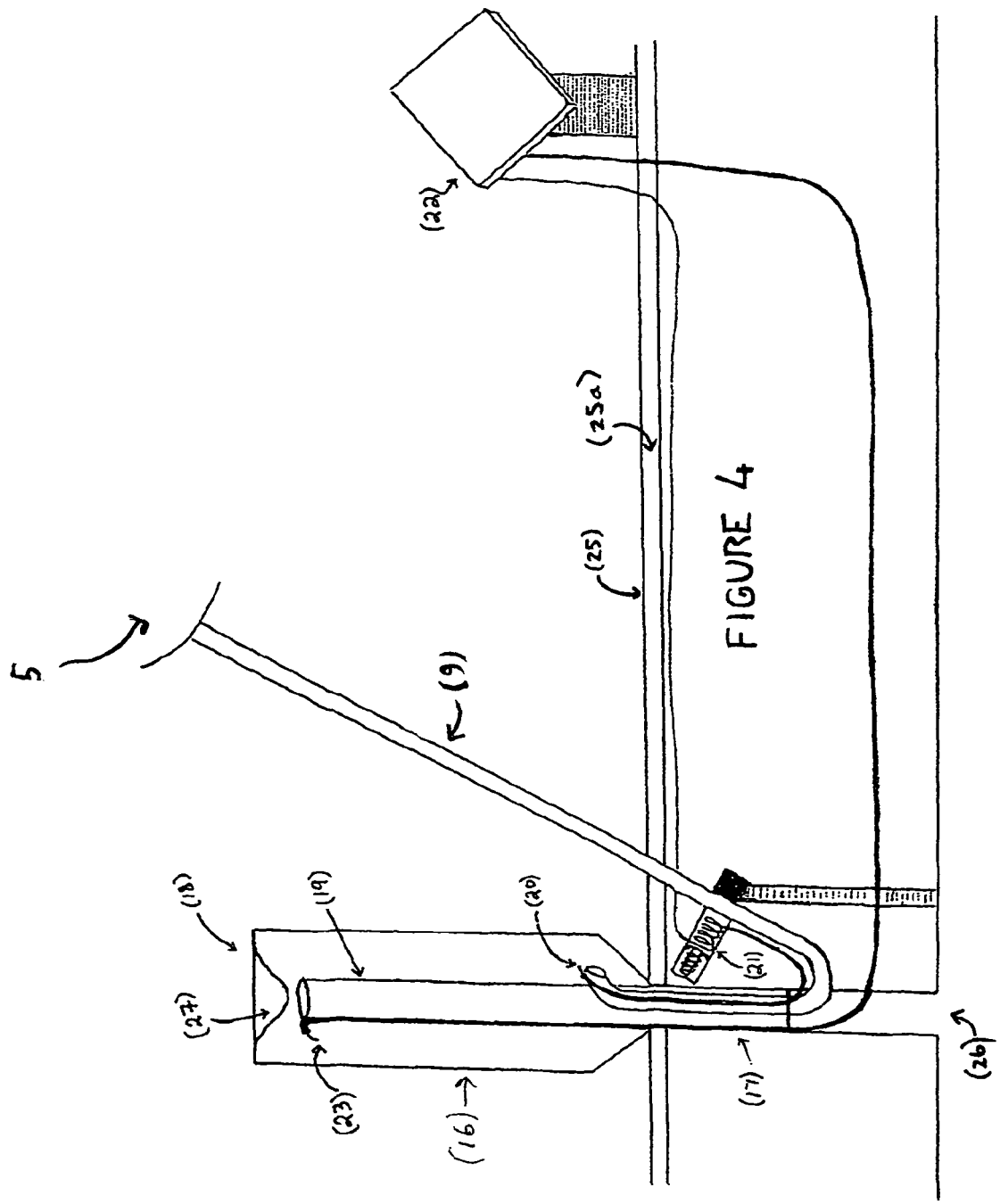
FIG. 4 is a side view of one of the inverted wine bottles where desalination occurs.
Figure 5:
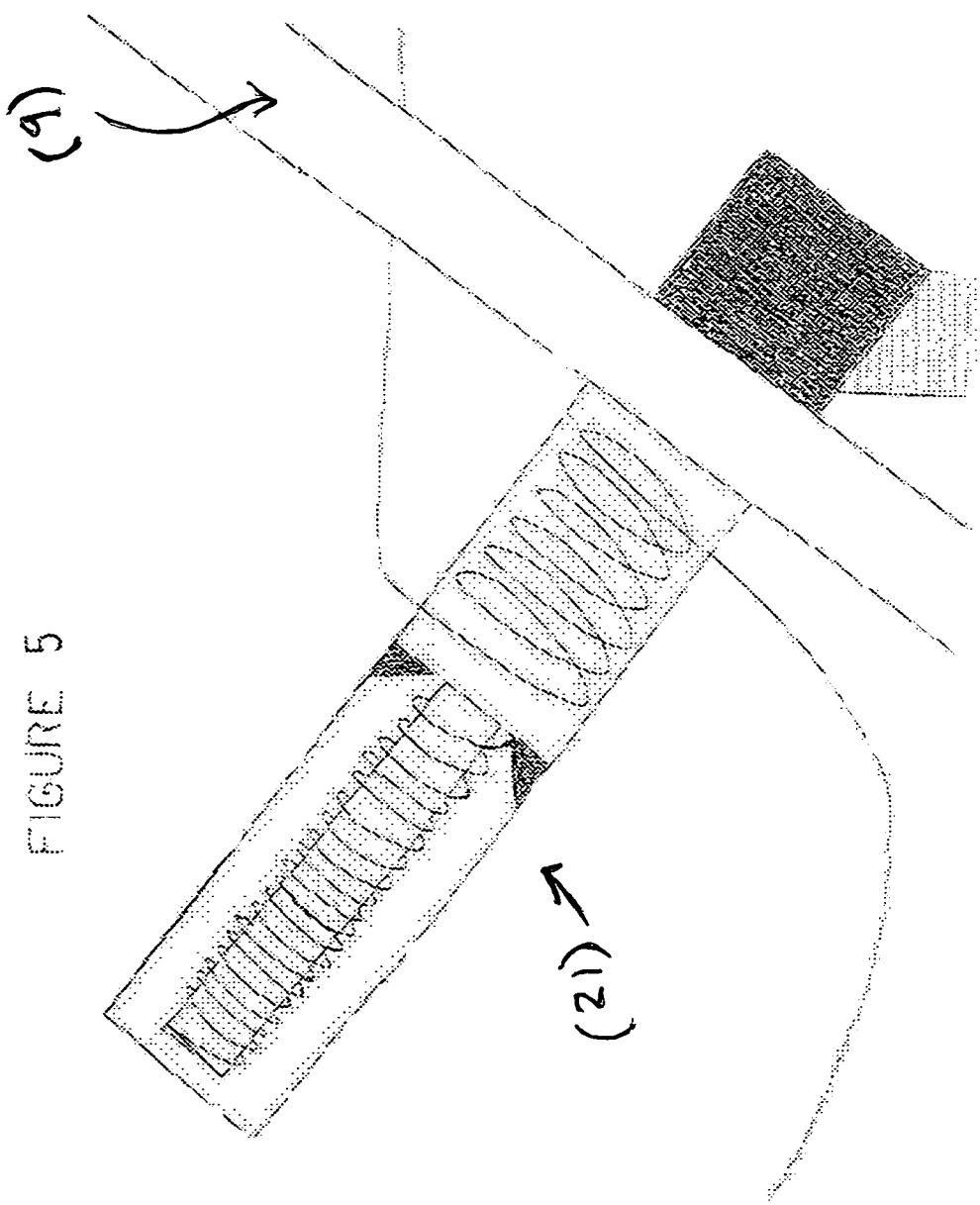
FIG. 5 is the view of an inactivated solenoid due to an incomplete electrical circuit.
Figure 6:
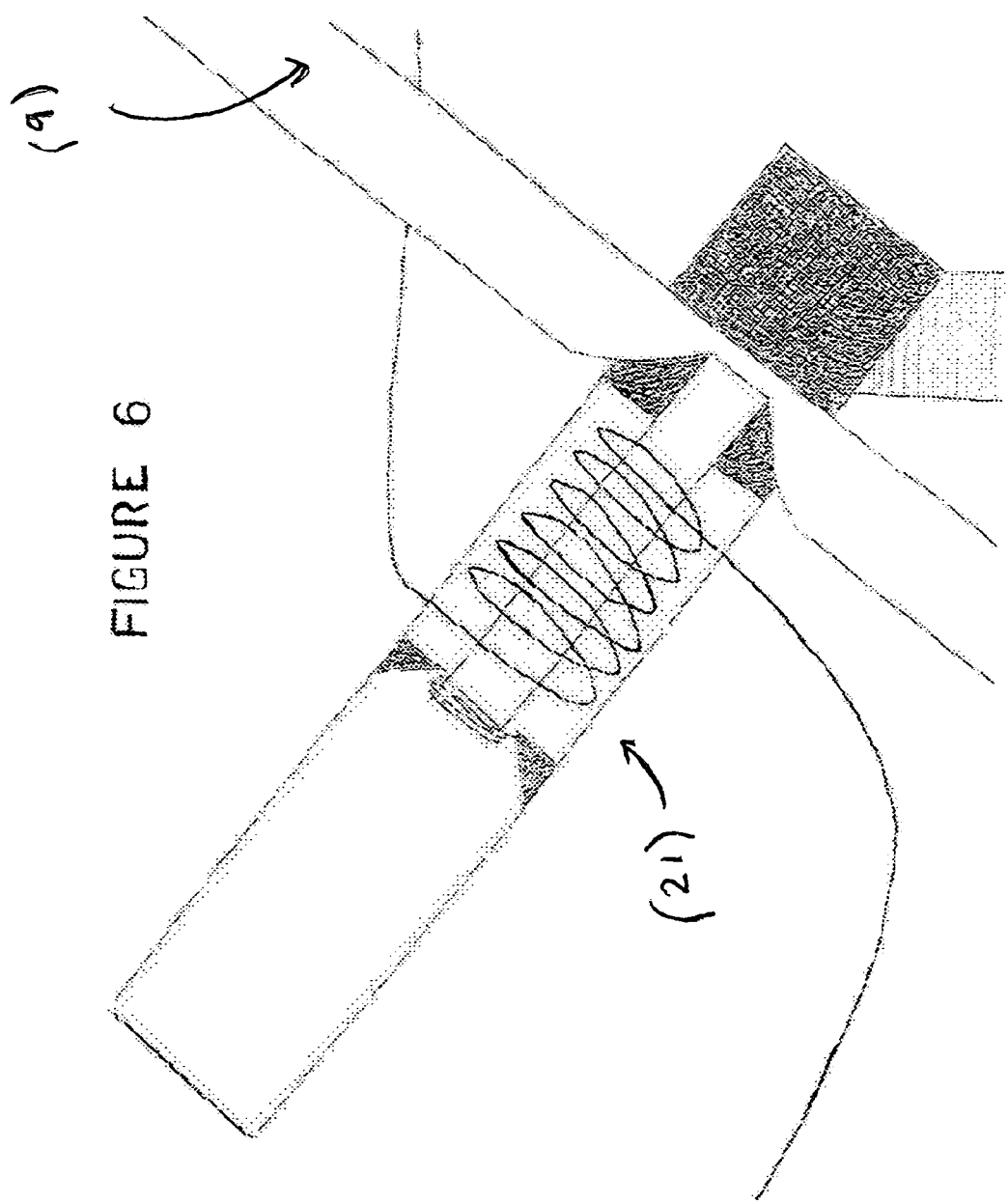
FIG. 6 is the view of an activated solenoid due to a completion of an electrical circuit.

Note that FIGS. 2 & 3 have an exposed cross-section (10) in the middle of the diagram & at the end, in order to better show the inner workings of the machine. Hence when the 1 cm holes (8) in the inner layer (7) are aligned with the 1 cm holes (8) in the outer layer (6), the filtered seawater can flow down the tubes (9). The holes (8) in the inner portion of the reservoir (7) will be aligned with the holes (8) in the outer portion of the reservoir (6) when the sun is shining. When the sun is not shining (night time), the inner layer portion of the reservoir (7) will rotate to block the holes (8) in the outer layer (6), thereby preventing seawater from flowing down the tubes (9).

The mechanism that will cause this to happen is via a solar powered solenoid. A solar panel (11), will have one electrical wire (11a) extending to the solenoid (12) which then reconnects to the solar panel (11). When the solar panel (11) is energized by the sun, it will create an electric current that will pass through the solenoid (12) and thus pull in a metal rod (13). This metal rod (13) is attached to the inner layer portion of the reservoir (7). Once the metal rod (13) is pulled into the solenoid (12), the holes (8) in the inner layer portion (7) are in alignment with the holes (8) of the outer portion (6) of the reservoir (5), thus allowing the flow of seawater out of the reservoir (5) and down the tubes (9). When the sunlight ceases, the solar panels (11) will no longer provide electricity to the solenoid (12), thereby causing release of the metal rod (13). The metal rod (13) retracts, because it is attached to the inner layer (7) of the reservoir (5). The inner layer portion (7)

of the reservoir (5) has a spring (14), that attaches it to an immovable portion of the outer layer (6) of the reservoir (5), causing it to retract.

The 1 cm diameter tubes (9) carry seawater down from the reservoir (5) and into empty 750 ml wine bottles (16). The empty space in the center of the donut shaped reservoir (5) is occupied with 143 wine bottles (16). The wine bottles (16) are inverted, such that their openings are facing the ground (17), and their closed-end bottoms are facing the sky (18).

The 1 cm diameter tubes (9) connected to the reservoir (5) extend out by 30 cm to 100 cm and are connected to the 750 ml wine bottles (16) via the natural opening of the bottle (17) on the side closest to the ground. The tube (9) extends up to one-fifth of the way up vertically into the bottle (16); in other words the tube (9) carrying seawater into the bottle (16) just penetrates the bottle (16) sufficiently enough to feed water into the bottle (16). The bottles (16) are grouped in the inner open space formed by the donut shaped seawater reservoir (5). This arrangement maximizes heat transfer to induce water evaporation while maximizing surface area to allow water condensation on the bottle (16) walls. Approximately 143 wine bottles (16) could be fit in a space having a 102 cm diameter on the inside donut shaped seawater reservoir (5). This donut shaped reservoir (5) would have, from outer edge to outer edge, a diameter of approximately 146 cm (5).

The reservoir (5) volume is slightly larger than by the total volume contained by the 143 bottles (16). The bottles (16) have their opening (17) facing the ground, and only wine bottles (16) that have a built-in indentation (27) in the center of the base (18) of the bottle (16) are ideal for collecting condensed water droplets. The approximate dimensions of a 750 ml glass wine bottle (16) are; 30.5 cm long, 7 cm diameter along the large part of the tube, and 8 cm neck with a 2.5 cm diameter at the opening.

Inside the bottles (16) lies a collecting tube (19) that extends ¾ of the way up inside the bottle (16). The collecting tube (19) fully occupies the rest of the opening of the bottle (17) (in other words two tubes (19) & (9) penetrate the bottle (16) and thus fully seals the opening (17)). An electric wire (20) enters the opening of the bottle (17) and penetrates the bottle (16) by approximately 1 cm into the bottle (16) past the neck. This electric wire (20) is connected to a solenoid (21). This solenoid (21) is then connected to the solar panel (22). Another electric wire (23) enters the bottle (16) by the same opening (17) but extends all the way to the top of the collecting tube (19).

The wire (23) that extends along the collecting tube (19) is completely sheathed for protection against water except for its tip at the upper portion of the collecting tube (19). This wire (23) is connected to a solar panel (22). If the water level in the bottle (16) rises close to ¾ of the way up the bottle (16), it will complete the electric circuit and cause the solenoid (21) to be activated, thereby acting to close the 1 cm tube (9) that distributes the filtered seawater into the bottle (16). This mechanism will ensure that the seawater does not overfill the bottle (16). This ensures that the seawater is kept separate from the fresh water.

At the end of the bottle (18) facing the sky is an indentation (27). The indentation (27) in the center of the base of the bottle (18) is ideal for collecting condensed water droplets.

Beneath the glass bottles (16), are metal pop cans (25) and metal beer cans (25) that have been opened such that their shiny metallic insides are facing towards the sky. They (25) will reflect sunlight back towards the bottles (16). Underneath the metal cans (25) lies a solid base board (25a) to support the weight of the bottles (16). Holes are fitted in this base board (25a) to allow the neck of the bottle (17) to pass through thereby lending support to the structure.

On a hot sunny day, the sunlight will shine down on the filtered seawater in the glass bottles (16). The sunlight will heat the seawater and cause water to evaporate and condense onto the indentation (27) at the closed end (18) of the bottles (16). The condensed water will then flow along the indentation (27) to its lowest point and fall into the collecting tube (19). The collecting tubes (19) of each of the bottles (16) connect to a fresh water reservoir (26) below. The fresh water reservoir (26) is located in a hole in the ground beneath the bottles (16) and is continuously drained into another reservoir in order to create a vacuum effect. This vacuum effect decreases the pressure in the collecting tubes (19) and thereby decreases the pressure inside the bottles (16), thereby enabling more rapid evaporation of the water.

The invention claimed is:
1. A desalination system, comprising:
a cone shaped pipe for collecting seawater from a source of seawater;
a filter grid for filtering the contaminated water received by the cone shaped pipe;
a cylindrical pipe for transferring the contaminated water from the filter grid to a doughnut shaped reservoir, wherein the doughnut shaped reservoir comprises:
an inner layer and an outer layer forming a ring around an empty center, wherein the inner layer and the outer layer have holes which allow the contaminated water to flow from the inner layer through the outer layer when the holes are aligned, and which seal the inner layer from the outer layer when the holes are not aligned, wherein the empty center is filled with a plurality of wine bottles, each of wine bottles comprising;
an open top end a closed bottom end, each wine bottle being inverted so that the closed bottom end is facing in a skyward direction, each wine bottle also having a supply tube inserted into the open end for supplying the contaminated water to each wine bottle from the doughnut shaped reservoir and a collecting tube that collects fresh water produced in the wine bottle; and
a metallic reflector placed under the plurality of wine bottles to reflect sunlight into the plurality of wine bottles; wherein
the contaminated water supplied to each wine bottle evaporates, the evaporated water is condensed on the closed end and the condensed water is collected by the collection tube.
2. The desalination system of claim 1, wherein the cone shaped pipe is between 1-5 meters in length.
3. The desalination system of claim 1, wherein the outer layer of the doughnut shaped reservoir is made of recycled aluminum cans.
4. The desalination system of claim 1, wherein the inner layer of the doughnut shaped reservoir is made of recycled aluminum cans.
5. The desalination system of claim 1, wherein the wine bottles are 750 mls wine bottles.

* * * * *